Feb. 7, 1967 R. C. WILLIAMS 3,302,589
LATERAL MOTION AXLE BEARING ADAPTOR
FOR RAILWAY CAR TRUCK
Filed Dec. 17, 1965 4 Sheets-Sheet 1

INVENTOR.
Ray C. Williams,
BY Parker & Carter
Attorneys.

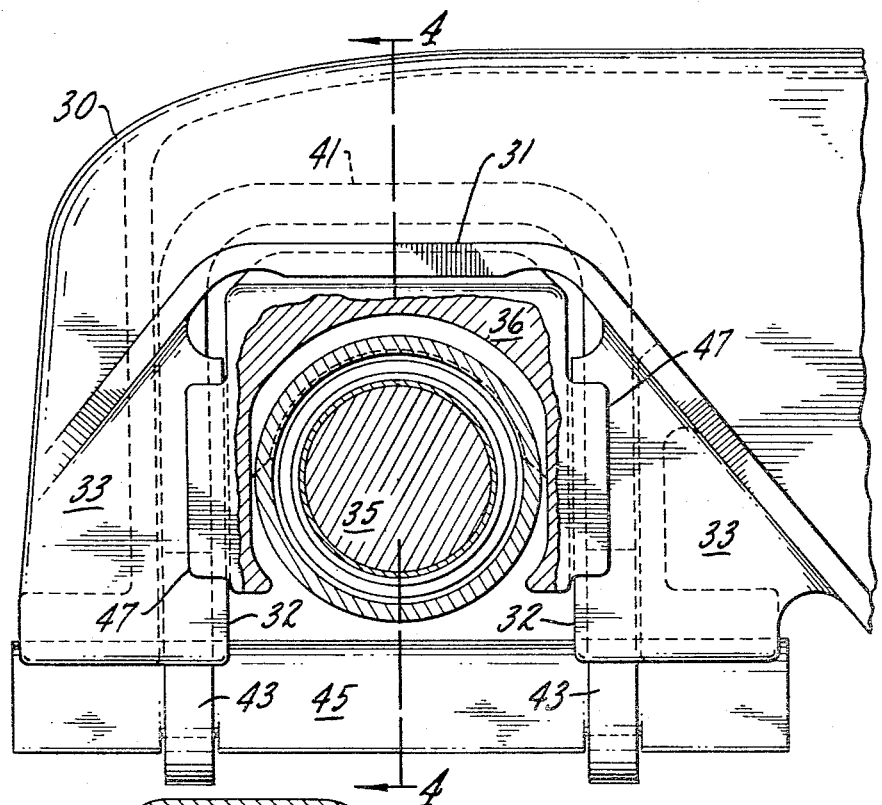
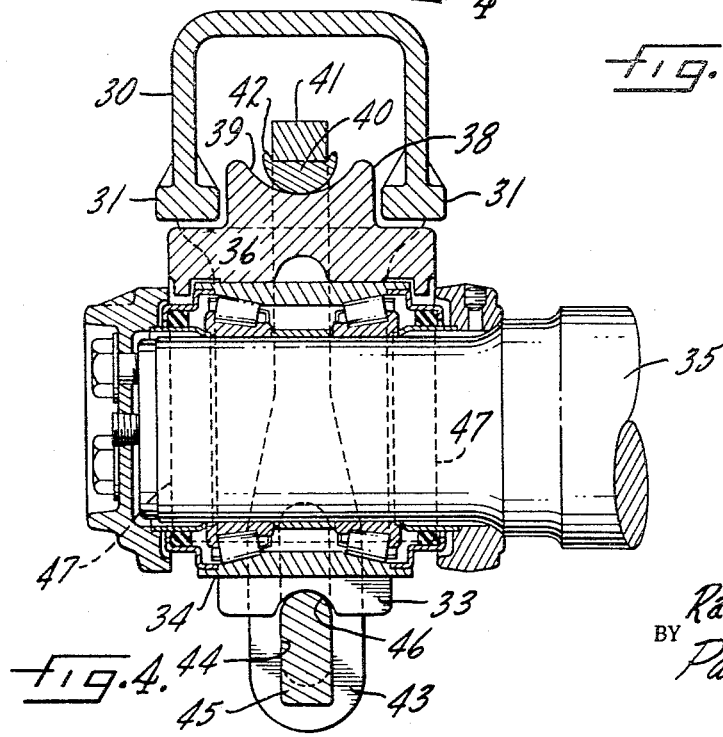

INVENTOR.
Ray C. Williams,
BY Parker & Carter
Attorneys.

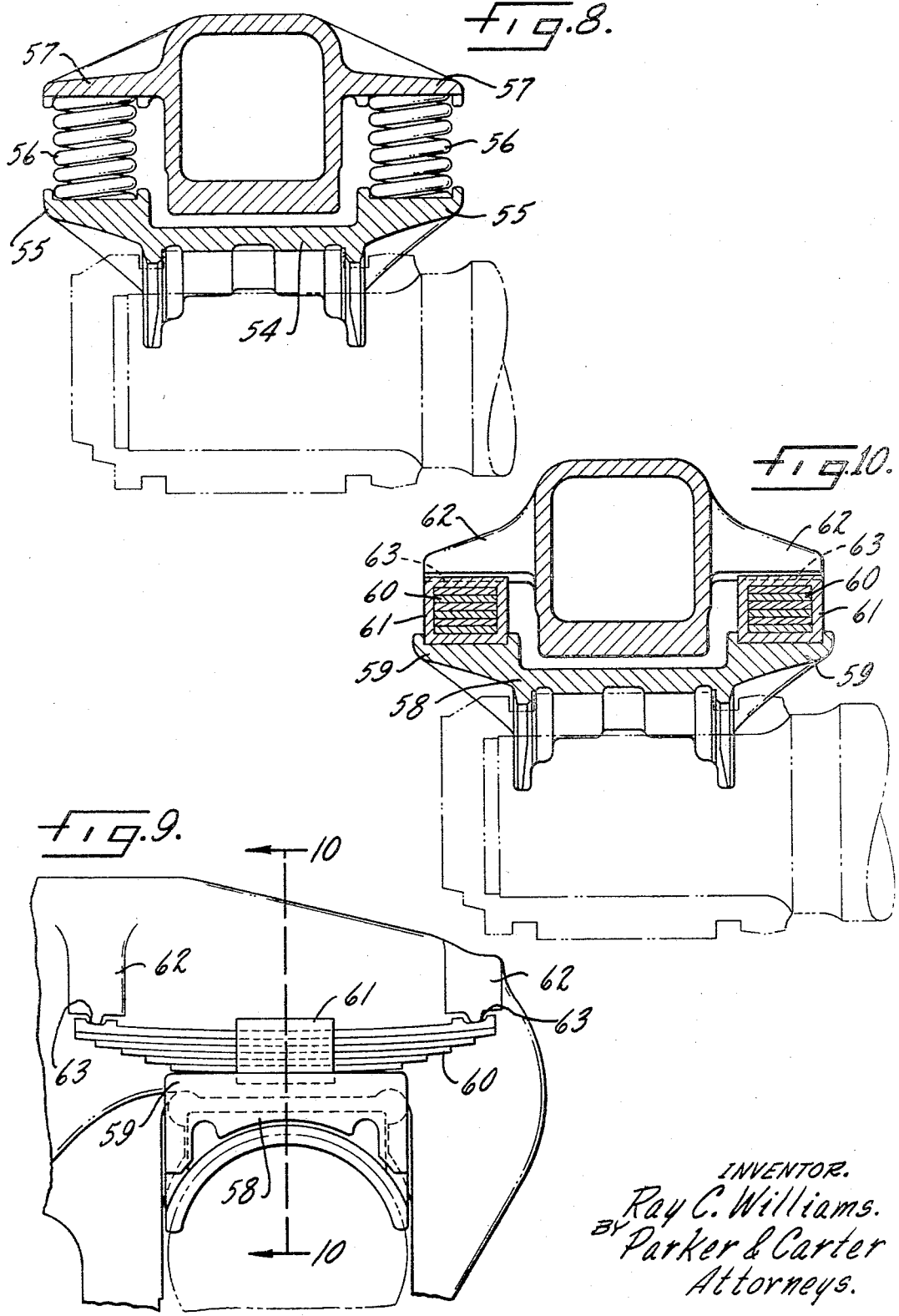

United States Patent Office
3,302,589
Patented Feb. 7, 1967

3,302,589
LATERAL MOTION AXLE BEARING ADAPTOR FOR RAILWAY CAR TRUCK
Ray C. Williams, Chicago, Ill., assignor to Standard Car Truck Company, Chicago, Ill., a corporation of New Jersey
Filed Dec. 17, 1965, Ser. No. 514,522
1 Claim. (Cl. 105—222)

This application is a continuation-in-part of co-pending application Serial Number 336,981, filed January 10, 1964, for "Lateral Motion Device for Railroad Car Trucks," now abandoned, which refers to an earlier application of Franklyn D. Barber, Serial Number 291,479, filed June 28, 1963, now abandoned.

This invention relates to improvements in anti-friction railroad car truck bearing adapters for use with railroad car bearings.

One object of the invention is to provide a saddle-like adapter which will rest on, interlock with and distribute the load of the car upon the anti-friction bearing so as to prevent distortion of the bearing race.

Another object is to provide an adapter located within a windowed car truck frame to inhibit horizontal movement cross-wise of the window while permitting vertical movement therein of the bearing.

Another object is to provide an adapter which will interlock with the car frame to limit longitudinal movement of the bearing perpendicular to the plane of the frame while permitting enough movement to provide for smooth car operation.

Anti-friction bearings must be precision engineering instruments. They habitually include an outer bearing race, distortion of which would destroy the bearing. The present invention therefore includes a saddle-like adapter which encircles the upper portion of the bearing to distribute upon the outer periphery of the bearing the car load which is transmitted from the car truck to the adapter. The means of transmitting this load must be such as will permit longitudinal movement of the railroad car axle and the bearing perpendicular to the truck frame. One function of the adapter is to limit such movement by interlocking with the car frame so as to prevent excessive longitudinal movement.

Figure 1:
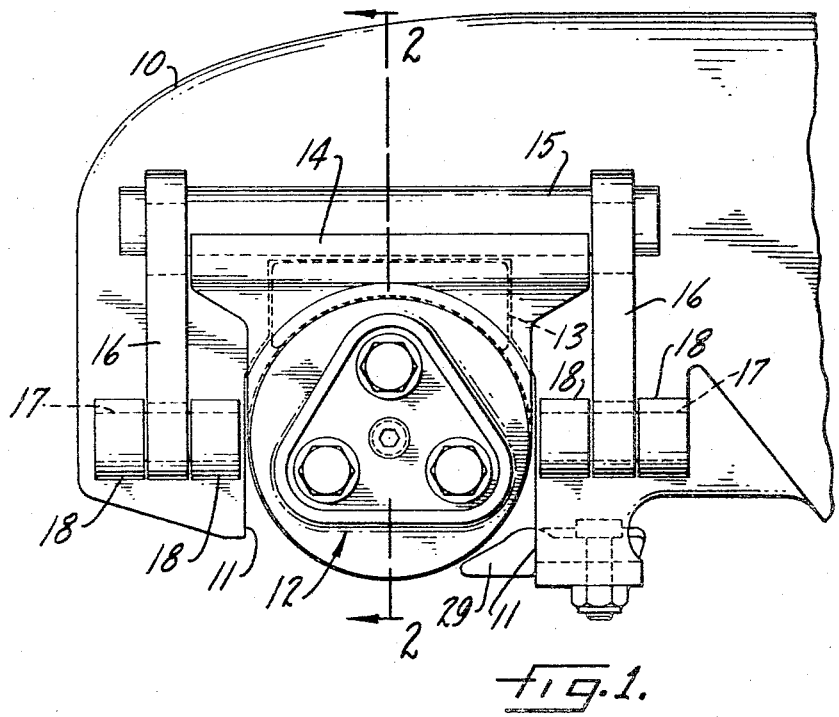
Figure 2:
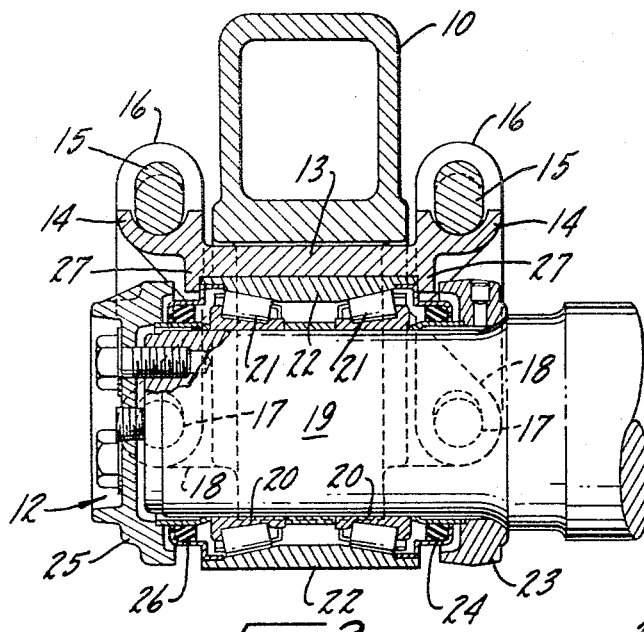
Figure 5:
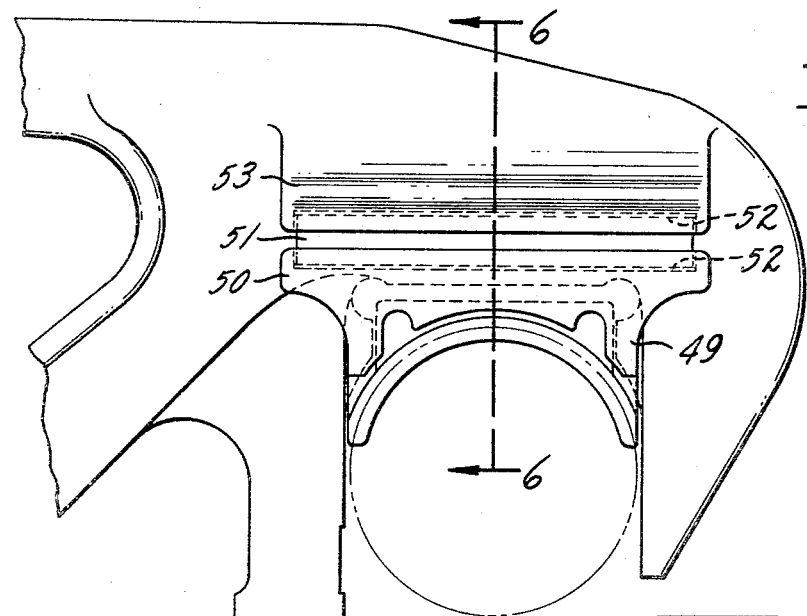
Figure 6:
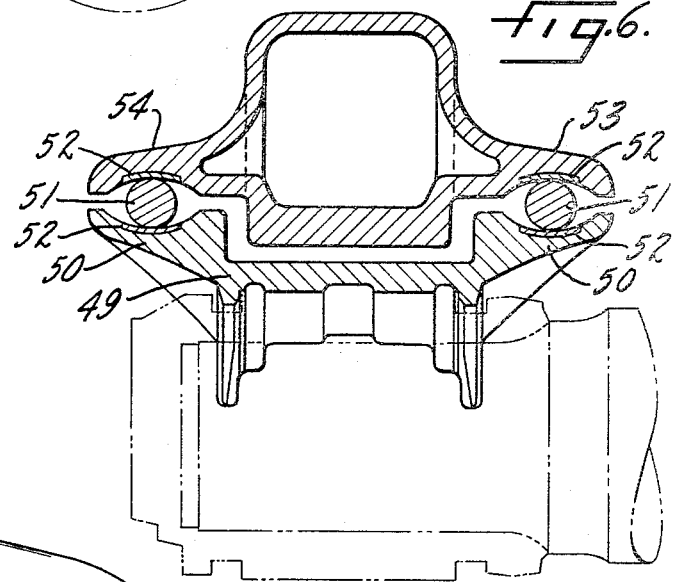
Figure 7:
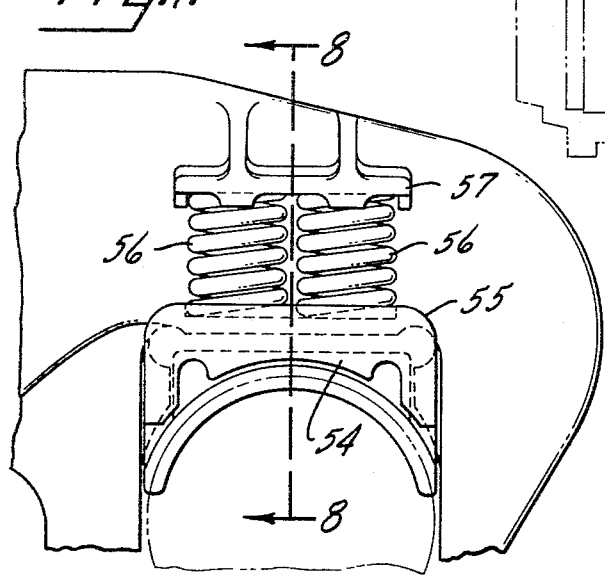

The invention is illustated more or less diagrammatically in the accompanying drawings, wherein:

FIGURE 1 is a side elevation of one end of a railroad car truck;
FIGURE 2 is a section along the line 2—2 of FIGURE 1;
FIGURE 3 is a side elevation of one end of a railroad car truck showing a modified form of the invention with parts in section;
FIGURE 4 is a section along the line 4—4 of FIGURE 2;
FIGURE 5 is a detail diagrammatic side elevation of a portion of a railroad car frame showing car axle and bearing in skeleton form;
FIGURE 6 is a section through the line 6—6 of FIGURE 5;
FIGURE 7 is a section similar to FIGURE 5 of a modified form;
FIGURE 8 is a section along the line 8—8 of FIGURE 7;
FIGURE 9 is a similar view of a modified form;
FIGURE 10 is a section along the line 10—10 of FIGURE 9.

Like parts are indicated by like numerals throughout the specification and drawings.

In the interest of clarity, the wheels, car body, and other conventional elements of a freight car truck assembly are omitted, being adequately illustrated in FIGURES 1 and 2 of the application of Franklyn D. Barber, Serial Number 291,479, filed June 28, 1963, now abandoned.

The railroad car truck side frame 10 has pedestals 11 vertically depending therefrom to define a window open at the bottom and closed at the top to receive a roller bearing unit housing 12. Resting on the unit housing 12 is a concave saddle-like adapter 13 which interlocks with and fits the unit to distribute the load applied to the saddle about the upper periphery of the unit, thus protecting it against distortion. The saddle projects outwardly on both sides of the frame and carries at either end upwardly extending flanges or platforms 14 on opposite sides of the frame. The width of the saddle where it is enclosed within the window is never greater than the diameter of the bearing to positively prevent contact of the bearing with the pedestal and is such as to permit vertical movement of the saddle in the window while inhibiting substantial horizontal movement in the plane of the car truck. The distance between the flanges 14 is greater than the width of the car frame so as to permit limited displacement of the saddle while positively limiting such displacement in a direction perpendicular to the frame. Mounted on the flanges 14 are top bearing pins 15 extending on both sides of the window along the frame. Downwardly depending from the pins 15 are swing hangers 16 which are pivoted on bearing pins 17 in lugs 18 which project from opposite sides of the frame on both sides of the window.

In operation, the weight of the freight car is carried through the conventional truck bolster, not shown, to the side frames, thence to the lugs on the side frames. At this point the weight is picked up by the swing hangers at their pinned bottom ends. This weight is carried by the swing hangers to the top bearings which rest in grooves in the top bearing platforms on the journal wedge, thence the weight is carried through the journal wedge to the roller bearing and from the bearing to the axle journal.

The roller bearing unit housing 12 encloses railroad car axle journal 19. A suitable roller bearing is illustrated though many others are well known in the art. The races 20 on the journal engage tapered rollers 21 which are enclosed by the bearing sleeve or race 22 in the usual manner. The collar 23 rotates with the axle and cooperates with the inner bearing seal 24. Cap 25 rotates with the axle, cooperates with the outboard seal 26. The adapter is inwardly flanged at 27 to enclose the roller bearing. The anti-friction bearing is thus held against longitudinal movement with respect to the railroad car axle but the axle and bearing with the adapter are free to move in the window parallel with the axle in the usual manner.

The key 29 bolted to one of the pedestals extends across the bottom of the window to prevent drop out of the roller bearing.

In the modified form of FIGURES 3 and 4, the railroad truck side frame 30 is a box section flanged at 31 to enclose the upper portion of the window defined on both sides by downwardly depending pedestals 32 which terminate in flanges 33 on both sides of the window. The anti-friction roller bearing 34 similar to the bearing shown in FIGURES 1 and 2 carries the axle 35. A U-shaped adapter 36 is concave in part to rest upon the housing 34 and extend between it and the two sides of the window defined by the pedestals 32. The adapter at its upper end above the journal, within the box section of the car frame has an upwardly extending bearing lug 38, concave at 39 to receive a semi-cylindrical bearing shoe 40, the radius of which is less than the radius of 39. A U-shaped swing hanger 41 rests on the shoe 40, being held in position by flanges 42 and extends across the adapter and has arms 43 depending on both sides within the window. These arms are slotted at 44 to receive the bearing bar 45 which engages the convex bearing race 46 of the lower face of the side frame 33. The two arms of the adapter are flanged at 47 on both sides of the side frame to extend beyond the window to mask the pedestals 32 to define pockets to enclose the swing hanger. The bearing lug 38 extending into the box frame permits but positively limits axial movement of the journal box.

In the modified form shown in FIGURES 5 to 10 inclusive, the adapter in each case encloses the upper peripheral portion of the bearing, interlocks with it and is constrained to axial movement therewith; such axial movement being limited by contact of some part of the adapter with some part of the frame, transverse horizontal movement of the bearing being limited by direct contact of the adapter with the side walls of the window.

In FIGURES 5 and 6 the adapter 49 has flanges 50 extending upwardly on both sides of the car frame to receive bearing rollers 51 on tracks 52 on flanges 53 extending outwardly from the side of the frame. The opposed tracks 52 being curved, tend to return the adapter to central position with respect to the frame after displacement has taken place and of course the flanges extending above the window positively limit lateral displacement.

In the modification shown in FIGURES 7 and 8, the adapter 54 is flanged at 55, the flanges extending upwardly as before above the top of the window to receive coil springs 56 upon which rest flanges 57 on the car truck frame. The springs permit axial movement of the adapter with respect to the car truck frame by bending the springs in the usual manner about their axes.

In the modified form shown in FIGURES 9 and 10, the adapter 58 is flanged at 59 to receive leaf springs 60 in spring boxes 61. Abutments 62 extend outwardly from the side frame to contact spring pockets 63 at the outermost end of the leaf springs, the leaf springs being able to rock slightly in the usual manner to permit axial movement of the adapter.

The various modifications shown in the drawings illustrate the wide range of variation permissible with respect to the adapter while maintaining aside from differences in detail, the essential elements of the adapter, namely: its essential relationship with the bearing and with the side frame of the car, namely: its essential relationship with the bearing and with the side frame of the car, quite independent of structural changes of side frame or adapter necessitated to take care of different kinds of lateral motion suspension members. The adapter always has the general characteristic that it encircles the upper portion of the bearing and extends across the window between the pedestals and because it interlocks with the bearing, it is the adapter and not the bearing that comes in contact with the pedestals to inhibit excessive horizontal movement perpendicular to the axis of the bearing. Thus the load applied by the adapter on the bearing is always distributed throughout a substantial portion of the upper half of the bearing or bearing housing and all the shocks, all the contacts between any part of the side frame and the adapter are carried by the adapter to protect the delicate bearing from such contact, shock or rubbing. The relationship between railroad car truck frame, bearing, axle, wheels and other elements are well established and well known and require no additional illustration at this time.

The adapter is to be used with bearings of many shapes, the concave face of the adapter being shaped to fit the bearing. In every case the adapter must interlock with the bearing and since the adapter encircles the larger part of the upper half of the bearing, as long as there is a load on the adapter applied to the bearing, the bearing is held against movement with respect to the adapter in a horizontal direction perpendicular to the axis of the bearing. The adapter is of such width as to extend across the window to limit relative lateral horizontal movement of adapter and so of the bearing within the window.

I claim:

In combination, a railroad car truck side frame having pedestals downwardly extending therefrom to define a window therethrough, the window having parallel vertical side walls, a railroad car axle and a generally cylindrical anti-friction bearing housing therefor contained within the window, the diameter of the housing being less than the horizontal width of the window, a bearing adaptor having a flat horizontal top, and a generally cylindrical concave under surface resting on, conforming to and interlocking with the housing to inhibit relative movement thereof, the adaptor having vertically disposed side walls extending downwardly from the top, intersecting the lower boundary of the concave under surface, terminating above the horizontal axis of the housing and penetrating the space between the outer periphery of the housing and the window walls to positively inhibit contact of the housing with the window walls, flanges extending laterally from the top of the adaptor beyond the truck frame, having elements extending radially on both sides of the frame, the clearance between such elements being sufficient to provide limited axial movement of the adaptor with respect to the frame, load carrying means free to swing as the adaptor moves axially with respect to the frame, interposed between the frame and the adaptor, engaging the frame and the adaptor above the lower periphery of the housing.

References Cited by the Examiner

UNITED STATES PATENTS

| | | | |
|---|---|---|---|
| 350,010 | 9/1886 | McAllister | 105—222 |
| 904,720 | 11/1908 | Peckham | 105—222 |
| 977,139 | 11/1910 | Sharpneck | 105—222 |
| 1,745,320 | 1/1930 | Brittain | 105—223 X |
| 1,781,213 | 11/1930 | Brittain | 105—223 |
| 1,810,876 | 6/1931 | Carry et al. | 105—224 X |
| 2,031,777 | 2/1936 | Johnson | 105—220 X |
| 2,085,689 | 6/1937 | Wallace et al. | 105—223 |
| 2,230,215 | 1/1941 | Mussey | 105—222 |
| 2,405,132 | 8/1946 | Brittain | 105—223 X |
| 2,410,580 | 11/1946 | Heater | 105—222 |

FOREIGN PATENTS 18,758   1914   Great Britain.

ARTHUR L. LA POINT, *Primary Examiner.*

H. BELTRAN, *Assistant Examiner.*